(12) United States Patent
Ura

(10) Patent No.: US 8,922,145 B2
(45) Date of Patent: Dec. 30, 2014

(54) RESOLVER/DIGITAL CONVERTER

(71) Applicant: Jtekt Corporation, Osaka (JP)

(72) Inventor: Noritake Ura, Anjo (JP)

(73) Assignee: Jtekt Corporation, Osaka (JP)

( * ) Notice: Subject to any disclaimer, the term of this patent is extended or adjusted under 35 U.S.C. 154(b) by 117 days.

(21) Appl. No.: 13/826,240

(22) Filed: Mar. 14, 2013

(65) Prior Publication Data
US 2013/0249453 A1 Sep. 26, 2013

(30) Foreign Application Priority Data

Mar. 23, 2012 (JP) ................................. 2012-067708

(51) Int. Cl.
*H02P 23/00* (2006.01)
*G01D 5/245* (2006.01)

(52) U.S. Cl.
CPC ............ *H02P 23/0036* (2013.01); *G01D 5/245* (2013.01)
USPC .................. 318/400.04; 318/400.01; 318/700

(58) Field of Classification Search
CPC ....................................................... H02P 23/00
USPC ................................. 318/400.04, 400.01, 700
See application file for complete search history.

(56) References Cited

U.S. PATENT DOCUMENTS 6,972,700 B2 * 12/2005 Kanekawa et al. ............ 341/116
7,343,254 B2 *  3/2008 Otsuka et al. ................... 702/58

FOREIGN PATENT DOCUMENTS

JP         A-2003-315097        11/2003

* cited by examiner

*Primary Examiner* — David S Luo
(74) *Attorney, Agent, or Firm* — Oliff PLC

(57) ABSTRACT

Three-phase resolver signals that are output from a resolver upon reception of an excitation signal are captured by a microcomputer. The microcomputer computes a rotation angle of an electric motor on the basis of the three-phase resolver signals. The ratio between an excitation period of the excitation signal and a capturing period of each of the three-phase resolver signals is set to 8:5. A computation period of the rotation angle is set to half of the least common multiple of the excitation period of the excitation signal and the capturing period of each resolver signal.

2 Claims, 7 Drawing Sheets

WHEN RATIO BETWEEN EXCITATION PERIOD T1
AND A/D SAMPLING PERIOD T2 IS 8:(8N-7)

WHEN RATIO BETWEEN EXCITATION PERIOD
T1 AND A/D SAMPLING PERIOD T2 IS 8:(8N-5)

WHEN RATIO BETWEEN EXCITATION PERIOD T1
AND A/D SAMPLING PERIOD T2 IS 8:(8N-3)

WHEN RATIO BETWEEN EXCITATION PERIOD T1
AND A/D SAMPLING PERIOD T2 IS 8:(8N-1)
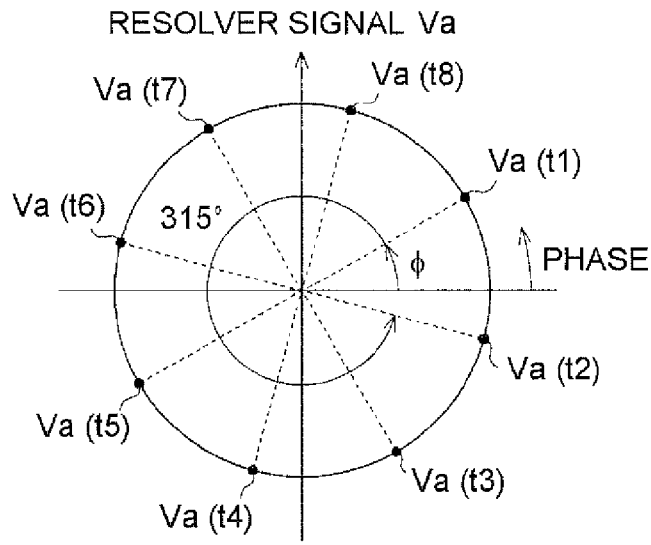
Fig. 9
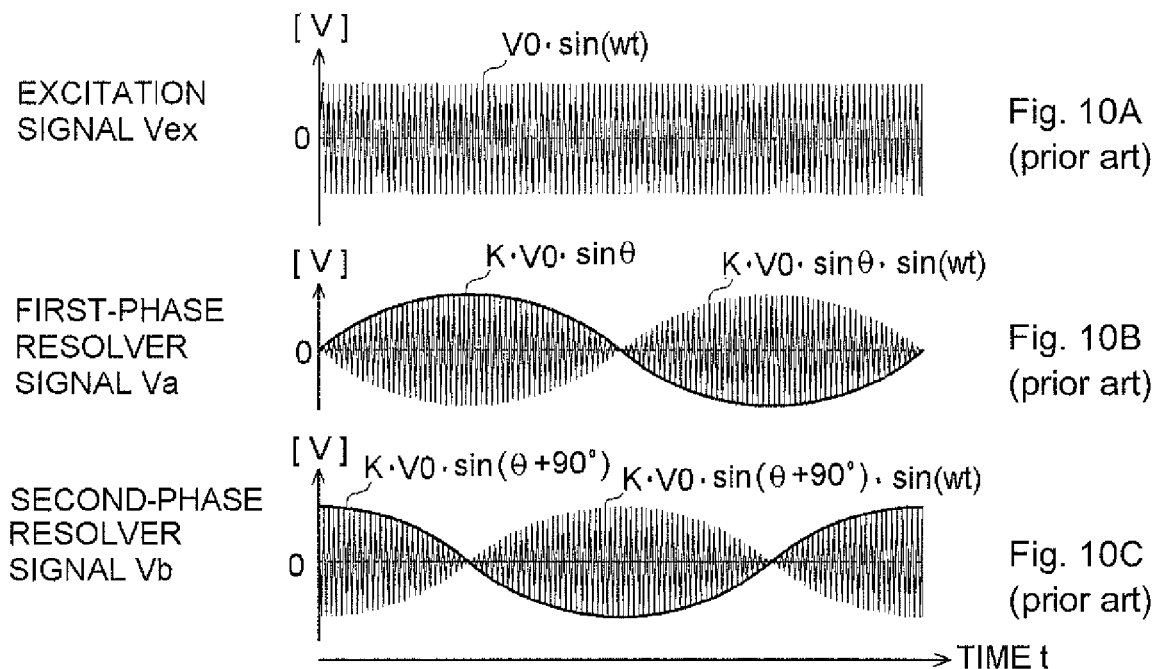
EXCITATION SIGNAL Vex — Fig. 10A (prior art)
FIRST-PHASE RESOLVER SIGNAL Va — Fig. 10B (prior art)
SECOND-PHASE RESOLVER SIGNAL Vb — Fig. 10C (prior art)

RESOLVER/DIGITAL CONVERTER

INCORPORATION BY REFERENCE/RELATED APPLICATION

This application claims priority to Japanese Patent Application No. 2012-067708 filed on Mar. 23, 2012 the disclosure of which, including the specification, drawings and abstract, is incorporated herein by reference in its entirety.

BACKGROUND OF THE INVENTION

1. Field of the Invention

The invention relates to a resolver/digital converter that converts a signal output from a resolver to angular data.

2. Discussion of Background

As one of devices that detect a rotation angle of a detection target, there are a resolver that outputs a voltage signal that corresponds to a rotation angle of a detection target and a resolver/digital converter that converts the signal output from the resolver (resolver signal) into angular data.

For example, when the resolver is configured to have one-phase excitation and two-phase outputs, if the resolver receives an excitation signal formed of an alternating-current voltage, the resolver outputs two-phase resolver signals that have phases that are different from each other by 90° and that change in accordance with the rotation angle of the detection target. Specifically, when the resolver receives an excitation signal Vex as shown in FIG. 10A, the resolver outputs a sinusoidal first-phase resolver signal Va as shown in FIG. 10B and a sinusoidal second-phase resolver signal Vb as shown in FIG. 10C. When the excitation signal Vex is $V0 \cdot \sin(\omega t)$, the first-phase resolver signal Va is $K \cdot V0 \cdot \sin\theta \cdot \sin(\omega t)$, and the second-phase resolver signal Vb is) $K \cdot V0 \cdot \sin(\theta+90°) \cdot \sin(\omega t)$. Here, "$\omega$" denotes an excitation angular frequency, "t" denotes time, "V0" denotes the amplitude of the excitation signal, "K" denotes the transformation ratio of the resolver, and "$\theta$" denotes the rotation angle (electric angle) of the detection target.

The resolver/digital converter captures the two-phase resolver signals Va, Vb, and acquires the amplitudes of the two-phase resolver signals Va, Vb. That is, the resolver acquires a value ($K \cdot V0 \cdot \sin\theta$) on the bold line in FIG. 10B for the first-phase resolver signal Va, and acquires a value ($K \cdot V0 \cdot \sin(\theta+90°)$) on the bold line in FIG. 10C for the second-phase resolver signal Vb. The resolver/digital converter computes the rotation angle of the detection target by computing the arctangent of the amplitude of each of the two-phase resolver signals Va, Vb. The resolver/digital converter computes the rotation angle at intervals of a predetermined period, and converts the two-phase resolver signals Va, Vb into digital angular data. As a resolver/digital converter of this type, a device described in Japanese Patent Application Publication No. 2003-315097 (JP 2003-315097 A) has been known.

In the resolver/digital converter described in JP 2003-315097 A, a computation period of the rotation angle is set on the basis of the least common multiple of an excitation period of an excitation signal and a capturing period (analog/digital (A/D) sampling period) of a resolver signal. Specifically, as shown in FIG. 11A, when an excitation period T1 is 80 μs and an A/D sampling period T2 is 50 μs, a computation period T3 is set to 400 μs. Thus, by superimposing data that are captured during the computation period T3, data Ds0 to Ds7 at eight points within one period of the excitation signal are captured as shown in FIG. 11B. The resolver/digital converter described in JP 2003-315097 A determines the amplitude of the resolver signal such that the residual sum of squares between the data Ds0 to Ds7 and a model function of the resolver signal becomes minimum, that is, computes the amplitude of the resolver signal by utilizing a so-called method of least squares. Thus, it is possible to accurately detect the amplitude of the resolver signal. Therefore, the accuracy of detection of the rotation angle improves.

According to a technique described in JP 2003-315097 A, depending on the excitation period and the A/D sampling period, the least common multiple of those periods may be increased and the computation period may become longer. Therefore, a resolver/digital converter that is able to compute a rotation angle within a shorter period has been demanded.

SUMMARY OF THE INVENTION

The invention provides a resolver/digital converter with which a computation period is shortened while the accuracy of computation of a rotation angle is ensured.

According to a feature of an example of the invention, in a resolver/digital converter that captures multiple-phase resolver signals which are output from a resolver upon reception of an excitation signal and of which amplitudes change in accordance with a rotation angle of a detection target, and that computes the rotation angle of the detection target on the basis of the multiple-phase resolver signals, where m is an integer larger than or equal to 1 and n is an odd number larger than or equal to 1, a ratio between an excitation period of the excitation signal and a capturing period of each of the resolver signals is set to 8×m:n, and a computation period of the rotation angle is set to half of a least common multiple of the excitation period of the excitation signal and the capturing period of each of the resolver signals.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 9 is a graph that shows changes in the first-phase resolver signal Va;

FIG. 10A to FIG. 10C respectively show changes in an excitation signal that is input into a resolver according to related art, changes in a first-phase resolver signal and changes in a second-phase resolver signal;

DETAILED DESCRIPTION OF EMBODIMENTS

Hereinafter, embodiments of the invention will be described with reference to the accompanying drawings.

Hereinafter, a resolver/digital converter according to an embodiment of the invention, which is used to detect the rotation angle of an electric motor, will be described with reference to FIG. 1 to FIG. 6. First, a vehicle electric power steering system on which an electric motor according to the present embodiment is mounted will be described with reference to FIG. 1.

Figure 1:
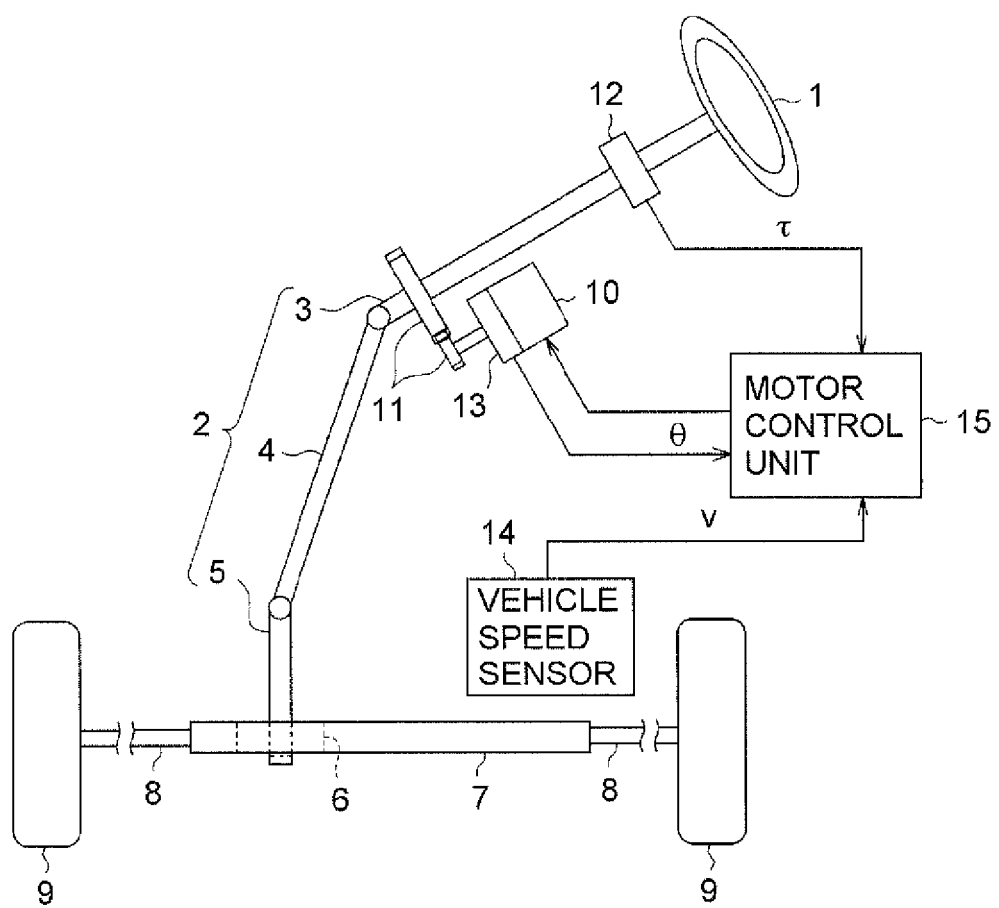
FIG. 1 is a block diagram that schematically shows a vehicle electric power steering system to which a resolver/digital converter according to an embodiment of the invention is applied.

As shown in FIG. 1, the electric power steering system includes a steering wheel 1 and a steering shaft 2. The steering wheel 1 is operated by a driver. The steering shaft 2 is coupled to the steering wheel 1. The steering shaft 2 is formed of a column shaft 3, an intermediate shaft 4 and a pinion shaft 5. The column shaft 3 is fitted to the steering wheel 1. The intermediate shaft 4 is connected to the column shaft 3. The pinion shaft 5 is connected to the intermediate shaft 4. A rack shaft 7 is coupled to the lower end portion of the pinion shaft 5 via a rack-and-pinion mechanism 6. With this configuration, when the steering shaft 2 rotates due to a driver's operation of the steering wheel 1, the rotational motion is converted into an axial reciprocating linear motion of the rack shaft 7 by the rack-and-pinion mechanism 6. The reciprocating linear motion of the rack shaft 7 is transmitted to steered wheels 9 via tie rods 8 coupled to respective ends of the rack shaft 7. Thus, the steered angle of the steered wheels 9, that is, the travel direction of a vehicle, is changed.

The electric power steering system includes an electric motor 10 as a mechanism that assists a driver's steering operation. The electric motor 10 applies assist force to the column shaft 3. The electric motor 10 is formed of a three-phase alternating-current motor. The electric power steering system applies motor torque to the steering shaft 2 by transmitting the rotation of the electric motor 10 to the column shaft 3 via a gear mechanism 11, thereby assisting a steering operation.

The electric power steering system includes various sensors used to detect, for example, the operation amount of the steering wheel 1 and the state quantity of the vehicle. For example, a torque sensor 12 is provided on the column shaft 3. The torque sensor 12 detects a torque (steering torque) τ that acts on the steering shaft 2. A resolver 13 is incorporated in the electric motor 10. The resolver 13 detects the rotation angle (electric angle) θ of the electric motor 10. A vehicle speed sensor 14 is provided on the vehicle. The vehicle speed sensor 14 detects a travelling speed v of the vehicle. Outputs from these sensors are input into a motor control unit 15. The motor control unit 15 executes drive control on the electric motor 10 on the basis of the outputs from the sensors.

Figure 2:
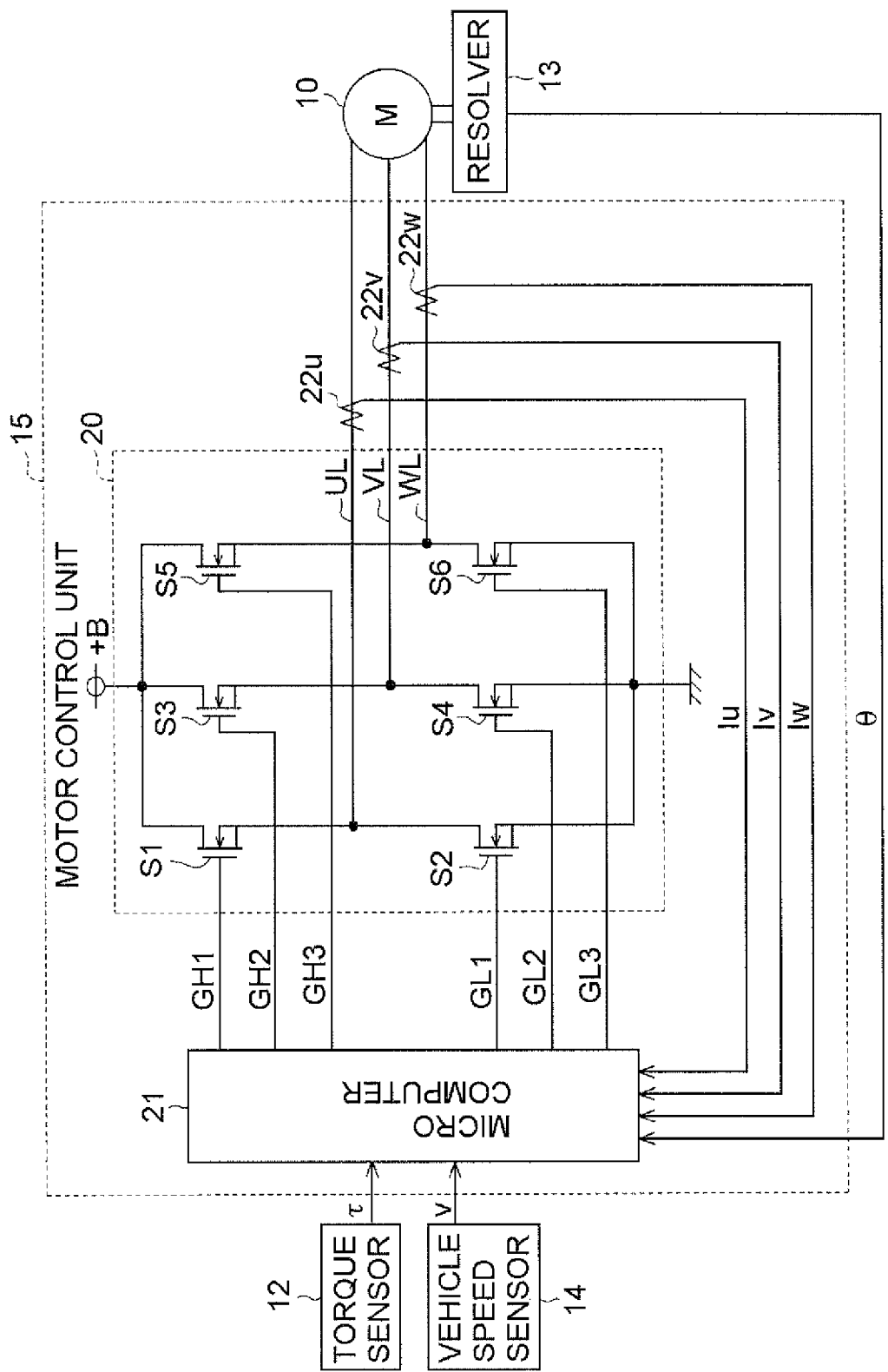
FIG. 2 is a block diagram that shows the electrical configuration of the electric power steering system.

As shown in FIG. 2, the motor control unit 15 includes an inverter circuit 20 and a microcomputer 21. The inverter circuit 20 converts direct current, which is supplied from a power supply (power supply voltage "+B"), such as an in-vehicle battery, into three-phase (U-phase, V-phase and W-phase) alternating currents. The microcomputer 21 drives the inverter circuit 20 through pulse width modulation (PWM).

The inverter circuit 20 is formed of a parallel circuit including a pair of transistors S1, S2, a pair of transistors S3, S4 and a pair of transistors S5, S6, and generates three-phase alternating currents from currents that are output from connection points of the respective pairs of transistors. That is, the transistors S1 to S6 are respectively subjected to switching according to gate driving signals GH1, GL1, GH2, GL2, GH3, GL3 that are output from the microcomputer 21. Thus, direct current from the power supply is converted into three-phase alternating currents. The obtained three-phase alternating currents are supplied to the electric motor 10 via a UL line, a VL line and a WL line.

The motor control unit 15 includes current sensors $22u$, $22v$, $22w$ that detect currents Iu, Iv, Iw that flow through the UL line, the VL line and the WL line, respectively. Outputs from the current sensors $22u$, $22v$, $22w$ are input into the microcomputer 21.

The microcomputer 21 drives the inverter circuit 20 through PWM, on the basis of the outputs from the torque sensor 12, the resolver 13, the vehicle speed sensor 14 and the current sensors $22u$, $22v$, $22w$. Specifically, the microcomputer 21 computes a q-axis current command value that corresponds to a target assist force, on the basis of the steering torque τ that is detected by the torque sensor 12 and the vehicle speed v that is detected by the vehicle speed sensor 14. The microcomputer 21 converts the phase current values Iu, Iv, Iw, which are respectively detected by the current sensors $22u$, $22v$ and $22w$, into a d-axis current value and a q-axis current value in a d/q coordinate system, on the basis of a rotation angle θ of the electric motor 10, which is detected by the resolver 13.

The microcomputer 21 computes a d-axis voltage command value and a q-axis voltage command value by executing current feedback control in the d/q coordinate system, and converts the computed d-axis voltage command value and q-axis voltage command value into phase voltage command values Vu, Vv, Vw on the basis of the rotation angle θ. The microcomputer 21 generates the gate driving signals GH1, GL1, GH2, GL2, GH3, GL3 from the phase voltage command values Vu, Vv, Vw, and supplies the gate driving signals GH1, GL1, GH2, GL2, GH3, GL3 to the gate terminals of the transistors S1 to S6. Thus, the transistors S1 to S6 are turned on or off, and the inverter circuit 20 is driven through PWM.

Figure 3:
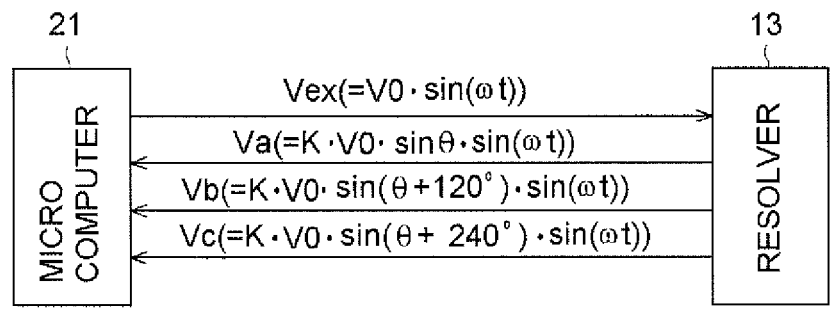
FIG. 3 is a block diagram that shows the details of signals that are exchanged between a resolver and a microcomputer in the electric power steering system.

Next, signals exchanged between the microcomputer 21 and the resolver 13 will be described in detail with reference to FIG. 3. The microcomputer 21 inputs the excitation signal Vex formed of an alternating-current voltage into the resolver 13. Upon reception of the excitation signal Vex, the resolver 13 outputs three-phase resolver signals Va to Vc which change in accordance with the rotation angle θ of the electric motor 10 and of which the phases are different from each other by 120°. Where the excitation signal Vex is $V0 \cdot \sin(\omega t)$, the first-phase resolver signal Va is $K \cdot V0 \cdot \sin \theta \cdot \sin(\omega t)$, the second-phase resolver signal Vb is $K \cdot V0 \cdot \sin(\theta+120°) \cdot \sin(\omega t)$, and the third-phase resolver signal Vc is $K \cdot V0 \cdot \sin(\theta+240°) \cdot \sin(\omega t)$. "ω" denotes an excitation angular frequency, "t" denotes time, "V0" denotes the amplitude of the excitation signal Vex, "K" denotes the transformation ratio of the resolver and "θ" denotes the rotation angle (electric angle) of the electric motor 10.

The microcomputer 21 captures the three-phase resolver signals Va to Vc that are output from the resolver 13 at intervals of a predetermined period, and computes the rotation angle (electric angle) θ of the electric motor 10 on the basis of these signals. Specifically, the microcomputer 21 acquires the amplitudes of the three-phase resolver signals Va to Vc and computes the arctangents of the amplitudes according to a known method, thereby computing the rotation angle θ. The microcomputer 21 computes the rotation angle θ at intervals of the predetermined period. As described above, in the present embodiment, the microcomputer 21 has the function as the resolver/digital converter.

Preferably, the frequency of the excitation signal Vex (=ω/2π) is set to a frequency (for example, 10 kHz to 20 kHz) at which the maximum transformation ratio is obtained by the resolver 13. Thus, it is possible to maximize the intensity of each of the three-phase resolver signals Va to Vc that are input into the microcomputer 21, the resolution for each resolver signal improves. In the present embodiment, the frequency of the excitation signal Vex is set to 12.5 kHz. This means that the excitation period T1 of the excitation signal Vex is set to 80 μs.

On the other hand, the capturing period (analog/digital (A/D) sampling period) T3 for each of the three-phase resolver signals Va to Vc is set a period that is synchronized with PWM control. In the present embodiment, the A/D sampling period T2 is set to 50 μs. As described above, in the present embodiment, the ratio between the excitation period T1 and the A/D sampling period T2 is set to 8:5.

Figure 4:
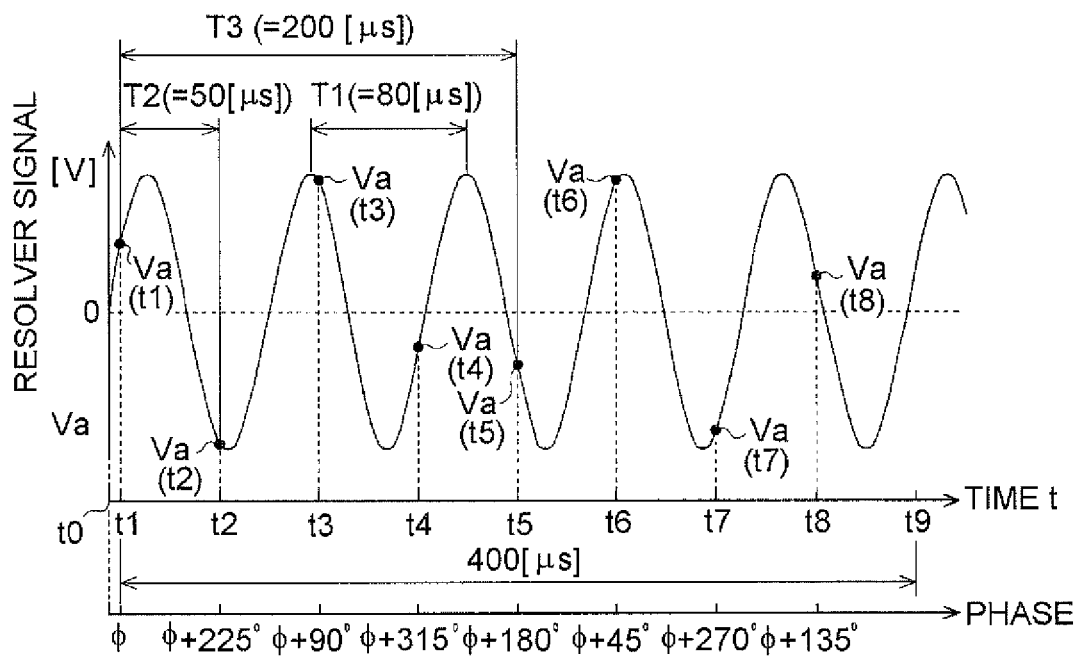
FIG. 4 is a graph that shows changes in a first-phase resolver signal Va.
Figure 5:
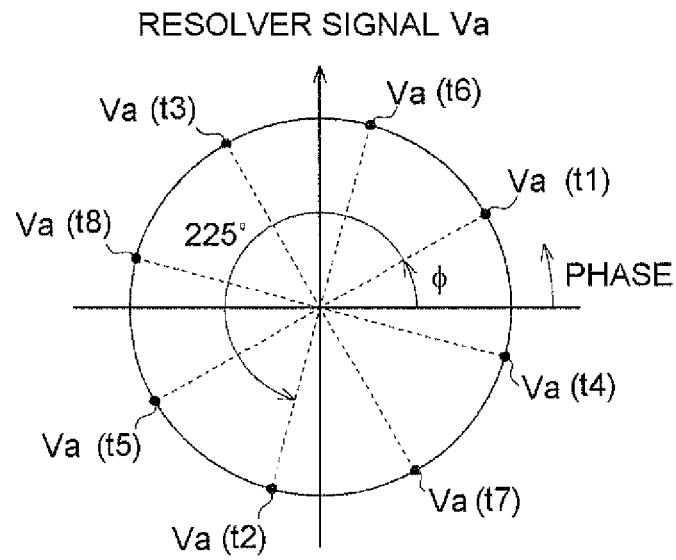
FIG. 5 is a graph that shows changes in the first-phase resolver signal Va.

Next, the principle of acquiring the amplitude of each of the three-phase resolver signals Va to Vc will be described with reference to FIG. 4 and FIG. 5. Hereinafter, for the sake of convenience, the case of the first-phase resolver signal Va will be described as a representative example. FIG. 4 is a graph that shows the correlation between the first-phase resolver signal Va, and time and the phase of the resolver signal Va. In FIG. 4, the ordinate axis represents the first-phase resolver signal Va and the abscissa axis represents time and the phase of the resolver signal Va. FIG. 5 shows the first-phase resolver signal Va in a polar coordinate system in which the amplitude is a moving radius and the phase is a declination. In FIG. 5, the ordinate axis represents a detected value of the resolver signal Va.

As shown in FIG. 4, when the microcomputer 21 starts capturing the resolver signal Va at time t1, the microcomputer 21 captures the resolver signal Va at intervals of the A/D sampling period T2 (at time t2, time t3, ... ) after time t1. This means that, when the phase of the resolver signal Va is φ at time t1, the resolver signal Va is captured from time t1 each time the phase deviation of 225°. The phase φ is computable on the basis of an elapsed time from time t0 at which the value of the resolver signal Va is 0 to time t1.

If the computation period of the rotation angle θ of the electric motor 10 is set to 400 μs that is the least common multiple of the excitation period T1 and the A/D sampling period T2, eight data Va(t1) to Va(t8) are respectively captured by the microcomputer 21 at time t1 to time t8 within a period from time t1 to time t9 at which 400 μs elapses. Here, when a method of least squares that determines the amplitude of the resolver signal Va such that the residual sum of squares between the data Va(t1) to Va(t8) and a model function of the resolver signal Va becomes minimum is utilized, the amplitude is obtained as follows.

Where the model function of the resolver signal Va is "Va=S·sin(ωt)", the residual sum of squares Sum between the data Va(t1) to Va(t8) and the resolver signal Va is expressed by Equation 1 indicated below. Here, the amplitude of the resolver signal Va is S(=K·V0·sin θ).

$$\mathrm{Sum}(S) = \{Va(t1) - S \cdot \sin(\phi)\}^2 + \{Va(t2) - S \cdot \sin(\phi + 225°)\}^2 + \\ \{Va(t3) - S \cdot \sin(\phi + 90°)\}^2 + \{Va(t4) - S \cdot \sin(\phi + 315°)\}^2 + \\ \{Va(t5) - S \cdot \sin(\phi + 180°)\}^2 + \{Va(t6) - S \cdot \sin(\phi + 45°)\}^2 + \\ \{Va(t7) - S \cdot \sin(\phi + 270°)\}^2 + \{Va(t8) - S \cdot \sin(\phi + 135°)\}^2$$

Equation 1

Here, the value of the amplitude S at the time when the residual sum of squares Sum(S) becomes minimum is the time at which a value obtained by differentiating the residual sum of squares Sum(S) with respect to the amplitude S is 0. When Sum(S) is differentiated with respect to the amplitude S, Equation 2 indicated below is obtained.

$$d(\mathrm{Sum}(S))/dS = -2 \cdot Va(t1) \cdot \sin(\phi) + 2 \cdot S \cdot \sin^2(\phi) - \\ 2 \cdot Va(t2) \cdot \sin(\phi + 225°) + 2 \cdot S \cdot \sin^2(\phi + 225°) - \\ 2 \cdot Va(t3) \cdot \sin(\phi + 90°) + 2 \cdot S \cdot \sin^2(\phi + 90°) - \\ 2 \cdot Va(t4) \cdot \sin(\phi + 315°) + 2 \cdot S \cdot \sin^2(\phi + 315°) - \\ 2 \cdot Va(t5) \cdot \sin(\phi + 180°) + 2 \cdot S \cdot \sin^2(\phi + 180°) - \\ 2 \cdot Va(t6) \cdot \sin(\phi + 45°) + 2 \cdot S \cdot \sin^2(\phi + 45°) - \\ 2 \cdot Va(t7) \cdot \sin(\phi + 270°) + 2 \cdot S \cdot \sin^2(\phi + 270°) - \\ 2 \cdot Va(t8) \cdot \sin(\phi + 135°) + 2 \cdot S \cdot \sin^2(\phi + 135°)$$

Equation 2

Then, the amplitude S at which d(Sum(S))/dS is 0 in Equation 2 is obtained.

On the other hand, Equation 3 to Equation 10 indicated below hold in accordance with a trigonometric identity.

$\sin(\phi+225°)=-\sin(\phi+45°)$  Equation 3

$\sin(\phi+90°)=\cos(\phi)$  Equation 4

$\sin(\phi+315°)=-\cos(\phi+45°)$  Equation 5

$\sin(\phi+180°)=-\sin(\phi)$  Equation 6

$\sin(\phi+270°)=-\cos(\phi)$  Equation 7

$\sin(\phi+135°)=\cos(\phi+45°)$  Equation 8

$\sin^2(\phi)+\cos^2(\phi)=1$  Equation 9

$\sin^2(\phi+45°)+\cos^2(\phi+45°)=1$  Equation 10

In addition, with reference to FIG. 5, Equation 11 to Equation 14 indicated below hold.

$Va(t5)=-Va(t1)$  Equation 11

$Va(t6)=-Va(t2)$  Equation 12

$Va(t7)=-Va(t3)$  Equation 13

$Va(t8)=-Va(t4)$  Equation 14

Then, when the amplitude S at which d(Sum(S))/dS is 0 is obtained from Equation 2 by utilizing Equation 3 to Equation 14, Equation 15 indicated below is obtained.

$S=\{(Va(t1)\cdot\sin(\phi)+Va(t2)\cdot\sin(\phi+225°)+Va(t3)\cdot\sin(\phi+90°)+Va(t4)\cdot\sin(\phi+315°)\}/4$  Equation 15

Here, as described above, the phase is a computable value. Thus, it is found that, from Equation 15, when the ratio between the excitation period T1 and the A/D sampling period T2 is 8:5, the eight data Va(t1) to Va(t8) are not required to compute the amplitude S and it is possible to compute the amplitude S having the same accuracy on the basis of the four data Va(t1) to Va(t4). In the present embodiment, the computation period T3 is set to 200 μs that is a period during which the resolver signal Va is captured four times, that is, half of the least common multiple of the excitation period T1 and the A/D sampling period T2.

Next, an example of an operation of the microcomputer 21 according to the present embodiment will be described with reference to FIG. 4. When the microcomputer 21 starts capturing the resolver signal Va at time t1, the microcomputer 21 captures the resolver signal Va at time t2, time t3, . . . at which the A/D sampling period T2 elapses after time t1. The microcomputer 21 computes the amplitude S of the first-phase resolver signal Va according to Equation 15, on the basis of the four data Va(t1) to Va(t4) that are captured in the period during which 200 μs that is the computation period T3 elapses from time t1.

Similarly, the microcomputer 21 computes the amplitude of each of the second-phase resolver signal Vb and the third-phase resolver signal Vc. The microcomputer 21 computes the rotation angle θ of the electric motor 10 on the basis of the amplitudes of the three-phase resolver signals Va to Vc. Thus, it is possible to compute the rotation angle in a period of 200 μs that is half of the least common multiple of the excitation period T1 and the A/D sampling period T2. As a result, it is possible to shorten the computation period T3.

As described above, according to the present embodiment, the following advantageous effects are obtained.

(1) The ratio between the excitation period T1 and the A/D sampling period T2 is set to 8:5. The computation period T3 is set to half of the least common multiple of the excitation period T1 and the A/D sampling period T2. Thus, it is possible to shorten the computation period while ensuring the accuracy of computation of the rotation angle θ. In addition, it is possible to detect the rotation angle of the electric motor 10 in a shorter period. As a result, it is possible to further accurately execute drive control on the electric motor 10.

(2) The frequency of the excitation signal Vex is set to the frequency at which the transformation ratio of the resolver 13 is the maximum value. Thus, the resolution for the resolver signal improves. As a result, it is possible to increase the accuracy of computation of the rotation angle.

Subsequently, alternative embodiments of the invention will be described with reference to FIG. 6 to FIG. 9. Description will be made on the fact that, where m is an integer larger than or equal to 1 and n is an odd number larger than or equal to 1, by setting the ratio between the excitation period T1 of the excitation signal Vex and the A/D sampling period T2 to 8×m:n, it is possible to set the computation period T3 to half of the least common multiple of the excitation period T1 and the A/D sampling period T2. FIG. 6 to FIG. 9 each are a graph that corresponds to FIG. 5 and each show the first-phase resolver signal Va in the polar coordinate system in which the amplitude is a moving radius and the phase is a declination, and the ordinate axis of each graph represents a detected value of the resolver signal Va. In FIG. 6 to FIG. 9, data of the resolver signal Va, which are captured by the microcomputer 21 at time t1 to time t8, are respectively denoted by Va(t1) to Va(t8).

Figure 6:
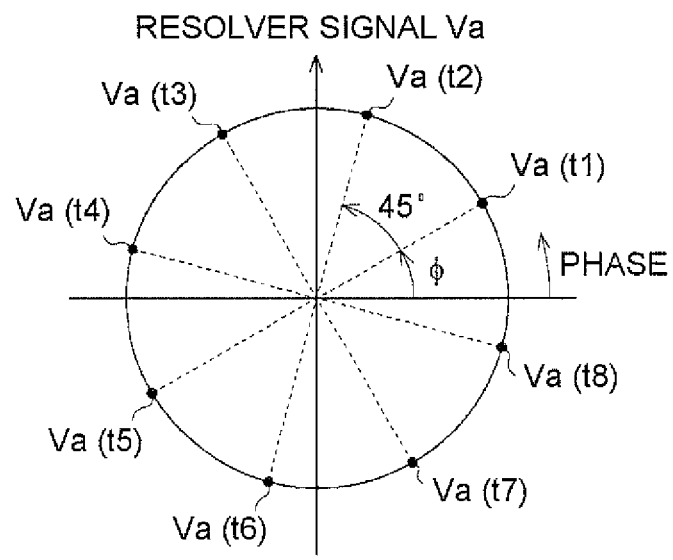
FIG. 6 is a graph that shows changes in the first-phase resolver signal Va.

First, description will be made on the case where the ratio between the excitation period T1 and the A/D sampling period T2 is 8:(8×N−7) where N is an integer larger than or equal to 1, with reference to FIG. 6. In this case, as shown in FIG. 6, the microcomputer 21 captures the data Va(t1) at time t1, and then captures data each time the phase of the resolver signal Va changes by 45°. At this time, the residual sum of squares Sum between the eight data Va(t1) to Va(t8) and the model function of the resolver signal Va is expressed by Equation 16 indicated below.

$$\mathrm{Sum}(S) = \{Va(t1) - S \cdot \sin(\phi)\}^2 + \{Va(t2) - S \cdot \sin(\phi + 45°)\}^2 +$$
$$\{Va(t3) - S \cdot \sin(\phi + 90°)\}^2 + \{Va(t4) - S \cdot \sin(\phi + 135°)\}^2 +$$
$$\{Va(t5) - S \cdot \sin(\phi + 180°)\}^2 +$$
$$\{Va(t6) - S \cdot \sin(\phi + 225°)\}^2 +$$
$$\{Va(t7) - S \cdot \sin(\phi + 270°)\}^2 + \{Va(t8) - S \cdot \sin(\phi + 315°)\}^2 \quad \text{Equation 16}$$

When the residual sum of squares Sum(S) is differentiated with respect to the amplitude S and then the amplitude S at which the residual sum of squares Sum(S) is 0 is obtained, it is possible to obtain the amplitude S as expressed by Equation 17.

$$S = \{Va(t1) \cdot \sin(\phi) + Va(t2) \cdot \sin(\phi + 45°) + Va(t3) \cdot \sin(\phi + 90°) + Va(t4) \cdot \sin(\phi + 135°)\}/4 \quad \text{Equation 17}$$

Thus, in the case where the ratio between the excitation period T1 and the A/D sampling period T2 is 8:(8×N−7) as well, it is possible to compute the amplitude S having the same accuracy as that of eight data, with the use of the four data. Therefore, it is possible to set the computation period T3 to half of the least common multiple of the excitation period T1 and the A/D sampling period T2.

Figure 7:
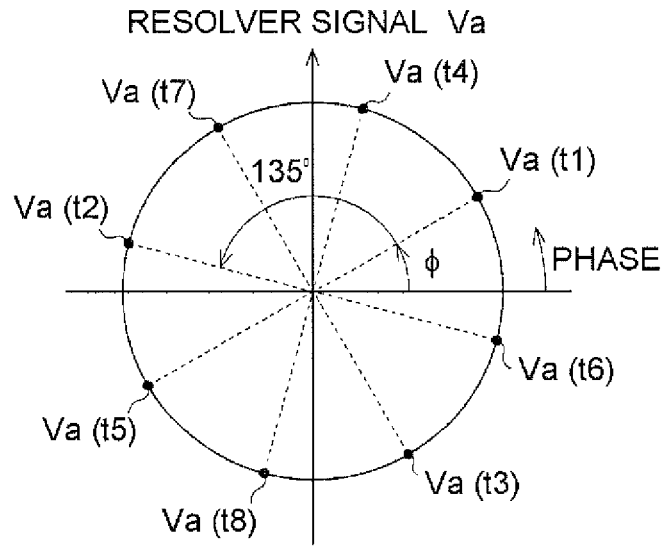
FIG. 7 is a graph that shows changes in the first-phase resolver signal Va.

Next, description will be made on the case where the ratio between the excitation period T1 and the A/D sampling period T2 is 8:(8×N−5), with reference to FIG. 7. In this case, as shown in FIG. 7, the microcomputer 21 captures the data Va(t1) at time t1, and then captures data each time the phase of the resolver signal Va changes by 135°. At this time, the residual sum of squares Sum between the eight data Va(t1) to Va(t8) and the model function of the resolver signal Va is expressed by Equation 18 indicated below.

$$\mathrm{Sum}(S) = \{Va(t1) - S \cdot \sin(\phi)\}^2 + \{Va(t2) - S \cdot \sin(\phi + 135°)\}^2 +$$
$$\{Va(t3) - S \cdot \sin(\phi + 270°)\}^2 +$$
$$\{Va(t4) - S \cdot \sin(\phi + 45°)\}^2 + \{Va(t5) - S \cdot \sin(\phi + 180°)\}^2 +$$
$$\{Va(t6) - S \cdot \sin(\phi + 315°)\}^2 +$$
$$\{Va(t7) - S \cdot \sin(\phi + 90°)\}^2 + \{Va(t8) - S \cdot \sin(\phi + 225°)\}^2 \quad \text{Equation 18}$$

When the residual sum of squares Sum(S) is differentiated with respect to the amplitude S and then the amplitude S at which the residual sum of squares Sum(S) is 0 is obtained, it is possible to obtain the amplitude S as expressed by Equation 19 indicated below.

$$S = \{Va(t1) \cdot \sin(\phi) + Va(t2) \cdot \sin(\phi + 135°) + Va(t3) \cdot \sin(\phi + 270°) + Va(t4) \cdot \sin(\phi + 45°)\}/4 \quad \text{Equation 19}$$

Thus, in the case where the ratio between the excitation period T1 and the A/D sampling period T2 is 8:(8×N−5) as well, it is possible to compute the amplitude S having the same accuracy as that of eight data, with the use of the four data. Therefore, it is possible to set the computation period T3 to half of the least common multiple of the excitation period T1 and the A/D sampling period T2.

Figure 8:
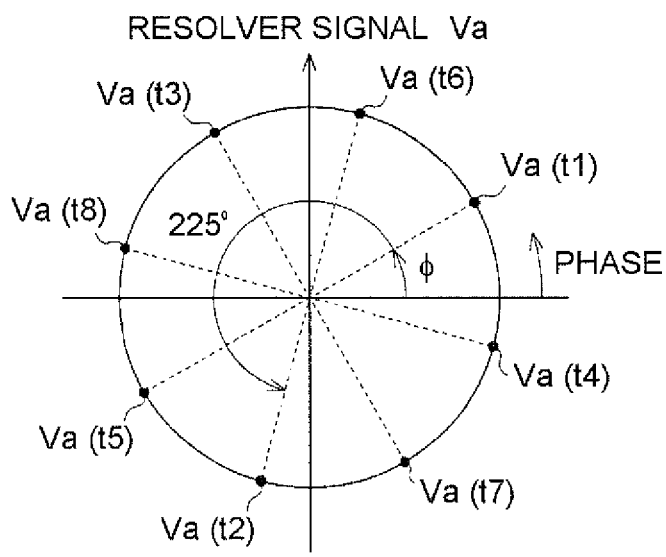
FIG. 8 is a graph that shows changes in the first-phase resolver signal Va.
Figure 11A:
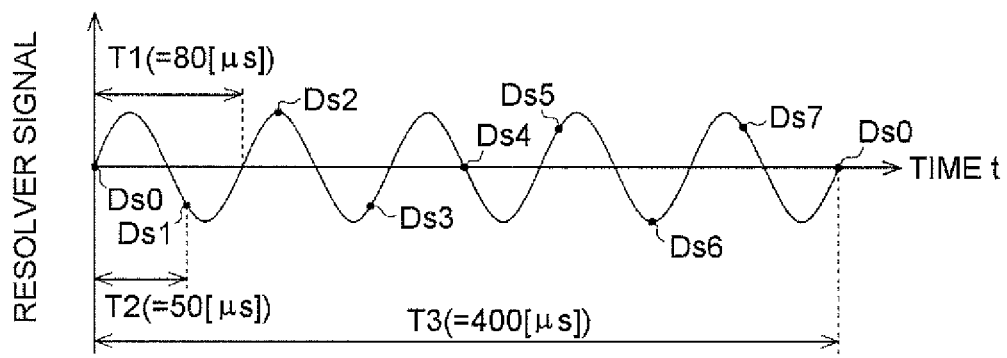
FIG. 11A is a graph that shows changes in each resolver signal according to the related art.
Figure 11B:
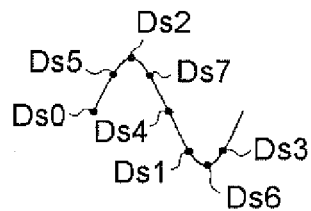
FIG. 11B is a graph that shows the correlation between each resolver signal and data that are detected by a resolver/digital converter according to the related art.

Next, description will be made on the case where the ratio between the excitation period T1 and the A/D sampling period T2 is 8:(8×N−3), with reference to FIG. 8. In this case, as shown in FIG. 8, the microcomputer 21 captures the data Va(t1) at time t1, and then captures data each time the phase of the resolver signal Va changes by 225°. Data that are captured at this time are similar to the data illustrated in FIG. 5. Therefore, the residual sum of squares Sum between the eight data Va(t1) to Va(t8) and the model function of the resolver signal Va is expressed by Equation 1. Thus, Equation 15 holds. Thus, in the case where the ratio between the excitation period T1 and the A/D sampling period T2 is 8:(8×N−3) as well, it is possible to compute the amplitude S having the same accuracy as that of eight data, with the use of the four data. Therefore, it is possible to set the computation period T3 to half of the least common multiple of the excitation period T1 and the A/D sampling period T2.

Next, description will be made on the case where the ratio between the excitation period T1 and the A/D sampling period T2 is 8:(8×N−1), with reference to FIG. 9. In this case, as shown in FIG. 9, the microcomputer 21 captures the data Va(t1) at time t1, and then captures data each time the phase of the resolver signal Va changes by 315°. At this time, the residual sum of squares Sum between the eight data Va(t1) to Va(t8) and the model function of the resolver signal Va is expressed by Equation 20 indicated below.

$$\text{Sum}(S) = \{Va(t1) - S \cdot \sin(\phi)\}^2 + \{Va(t2) - S \cdot \sin(\phi + 315°)\}^2 + \quad \text{Equation 20}$$
$$\{Va(t3) - S \cdot \sin(\phi + 270°)\}^2 +$$
$$\{Va(t4) - S \cdot \sin(\phi + 225°)\}^2 +$$
$$\{Va(t5) - S \cdot \sin(\phi + 180°)\}^2 +$$
$$\{Va(t6) - S \cdot \sin(\phi + 135°)\}^2 +$$
$$\{Va(t7) - S \cdot \sin(\phi + 90°)\}^2 + \{Va(t8) - S \cdot \sin(\phi + 45°)\}^2$$

When the residual sum of squares Sum(S) is differentiated with respect to the amplitude S and then the amplitude S at which the residual sum of squares Sum(S) is 0 is obtained, it is possible to obtain the amplitude S as expressed by Equation 21.

$$S = \{Va(t1)\cdot\sin(\phi) + Va(t2)\cdot\sin(\phi+315°) + Va(t3)\cdot\sin(\phi+270°) + Va(t4)\cdot\sin(\phi+225°)\}/4 \quad \text{Equation 21}$$

Thus, in the case where the ratio between the excitation period T1 and the A/D sampling period T2 is 8:(8×N−1) as well, it is possible to compute the amplitude S having the same accuracy as that of eight data, with the use of the four data. Therefore, it is possible to set the computation period T3 to half of the least common multiple of the excitation period T1 and the A/D sampling period T2.

As described above, where n is an odd number larger than or equal to 1, by setting the ratio between the excitation period T1 and the A/D sampling period T2 to 8:n, it is possible to set the computation period T3 to half of the least common multiple of the excitation period T1 and the A/D sampling period T2. In addition, where m is an integer larger than or equal to 1, when the ratio between the excitation period T1 of the excitation signal Vex and the A/D sampling period T2 is set to 8×m:n as well, it is possible to similarly set the computation period T3 to half of the least common multiple of the excitation period T1 and the A/D sampling period T2. Thus, the excitation period T1 and the A/D sampling period T2 may be changed as needed such that the ratio between the excitation period T1 and the A/D sampling period T2 satisfies 8×m:n.

The above-described embodiment may be modified into the following alternative embodiments as needed.

The frequency of the excitation signal Vex is not limited to the frequency at which the transformation ratio of the resolver 13 is the maximum value. Alternatively, the frequency of the excitation signal Vex may be changed as needed.

In the above-described embodiment, the three-phase-output resolver 13 is used. Alternatively, for example, a two-phase-output resolver may be used.

The device to which the invention is applied is not limited to a microcomputer that detects a rotation angle of an electric motor on the basis of a signal output from a resolver. The invention may be applied to an appropriate resolver/digital converter that detects a rotation angle of a detection target on the basis of a signal output from a resolver.

What is claimed is:

1. A resolver/digital converter that captures multiple-phase resolver signals which are output from a resolver upon reception of an excitation signal and of which amplitudes change in accordance with a rotation angle of a detection target, and that computes the rotation angle of the detection target on the basis of the multiple-phase resolver signals, wherein where m is an integer larger than or equal to 1 and n is an odd number larger than or equal to 1, a ratio between an excitation period of the excitation signal and a capturing period of each of the resolver signals is set to 8×m:n, and a computation period of the rotation angle is set to half of a least common multiple of the excitation period of the excitation signal and the capturing period of each of the resolver signals.

2. The resolver/digital converter according to claim 1, wherein a frequency of the excitation signal is set to a frequency at which a transformation ratio of the resolver is a maximum value.

* * * * *